(12) United States Patent
Schoeley et al.

(10) Patent No.: US 7,745,531 B2
(45) Date of Patent: Jun. 29, 2010

(54) CROSSLINKABLE COMPOSITIONS BASED ON ORGANOSILICON COMPOUNDS

(75) Inventors: Peter Schoeley, Diera-Zehren (DE); Gabriele Dineiger, Meissen (DE); Uwe Scheim, Coswig (DE)

(73) Assignee: Wacker Chemie AG, Munich (DE)

( * ) Notice: Subject to any disclaimer, the term of this patent is extended or adjusted under 35 U.S.C. 154(b) by 114 days.

(21) Appl. No.: 11/755,103

(22) Filed: May 30, 2007

(65) Prior Publication Data

US 2007/0282060 A1 Dec. 6, 2007

(30) Foreign Application Priority Data

Jun. 6, 2006 (DE) .................. 10 2006 026 227

(51) Int. Cl.
- *C08L 83/04* (2006.01)
- *C08K 3/26* (2006.01)
- *C08G 77/04* (2006.01)
- *C08G 77/18* (2006.01)

(52) U.S. Cl. .................. 524/588; 524/80; 524/424; 524/425; 428/446; 428/447; 528/33; 528/34

(58) Field of Classification Search .................. 524/588, 524/80, 424–425; 428/446–447; 528/33–34
See application file for complete search history.

(56) References Cited

U.S. PATENT DOCUMENTS

| 3,451,833 | A | | 6/1969 | Bonitz et al. | |
|---|---|---|---|---|---|
| 4,959,407 | A | * | 9/1990 | Rich et al. | 524/425 |
| 4,962,152 | A | * | 10/1990 | Leempoel | 524/788 |
| 5,037,878 | A | | 8/1991 | Cerles et al. | |
| 6,951,912 | B2 | | 10/2005 | Scheim et al. | |
| 7,049,384 | B1 | | 5/2006 | Friebe et al. | |
| 2005/0197436 | A1 | * | 9/2005 | Czubarow | 524/405 |
| 2007/0100110 | A1 | * | 5/2007 | Scheim et al. | 528/38 |
| 2007/0123640 | A1 | * | 5/2007 | Cross et al. | 524/588 |
| 2007/0208108 | A1 | * | 9/2007 | Wakabayashi et al. | 523/200 |
| 2007/0265380 | A1 | * | 11/2007 | Fukunaga | 524/426 |

FOREIGN PATENT DOCUMENTS

| DE | 195 07 416 C1 | | 9/1996 |
|---|---|---|---|
| DE | 101 21 514 A1 | | 11/2002 |
| EP | 0 104 787 B1 | | 4/1984 |
| EP | 0400439 A | | 12/1990 |
| GB | 1012477 A | | 12/1965 |
| WO | WO 2005049730 A1 | * | 6/2005 |
| WO | WO2005063872 A2 | * | 7/2005 |
| WO | WO 2005097908 A1 | * | 10/2005 |

OTHER PUBLICATIONS

MSDS for Saxolith 2 HE.*
http://cameochemicals.noaa.gov/chemical/25038, 2010, 6 pages.*

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

Crosslinkable compositions based on organosilicon compounds with a very high storage stability contain fine-particle metacarbonate. Storage stability of the composition is increased as compared to conventional forms of carbonates.

20 Claims, No Drawings

CROSSLINKABLE COMPOSITIONS BASED ON ORGANOSILICON COMPOUNDS

BACKGROUND OF THE INVENTION

1. Field of the Invention

The invention relates to crosslinkable compositions with very high storage stability, based on organosilicon compounds to a process for their preparation, and also to their use.

2. Background Art

Single-component sealing compositions (RTV-1) which are storable if water is excluded but which vulcanize to give elastomers at room temperature when exposed to water have been known for a long time. Large amounts of these products are used for example in the construction industry. These mixtures are based on polymers terminated by silyl groups bearing reactive substituents such as OH groups, or hydrolyzable groups, e.g. alkoxy groups. These sealing compositions may also comprise fillers, plasticizers, crosslinking agents, catalysts, and other additives. Among the known fillers are fine-particle metal oxides and metal salts. When these are used in sealing compositions they can not only optimize selected performance characteristics of the cured product but also improve the specific properties of the sealing composition during application.

EP 10104787 B describes, for example, the use of materials known as heavy calcium carbonates, obtained via milling of limestone. Furthermore, DE 195 07 416 C discloses the use of precipitated chalks in RTV-1 silicone rubber compositions. The use of ground natural chalks is also mentioned. However, a particularly problematic factor described here was the poor storage stability of RTV-1 silicone rubber compositions which eliminate alcohol, this being discernible as markedly delayed hardening following application. Additions of ortho-phosphoric esters for improving storage stability are disclosed.

DE 101 21 514 A also describes an improvement in the storage stability of RTV-1 silicone rubber compositions which eliminate alcohol, using tin catalysts which have phosphorus compounds as ligands. Emphasis is placed on the possibility of preparing colorless, transparent RTV-1 silicone rubber compositions.

SUMMARY OF THE INVENTION

The invention provides crosslinkable compositions, based on organosilicon compounds, which further comprise fine-particle metacarbonate. The crosslinkable compositions are preferably compositions crosslinkable via a condensation reaction, which, for the purposes of the present invention, is intended to also encompass any preceding hydrolysis step. For the purposes of the present invention, the expression "condensable radicals" is also intended to mean those radicals which concomitantly include any preceding hydrolysis step.

DETAILED DESCRIPTION OF THE PREFERRED EMBODIMENT(S)

The inventive compositions are preferably those capable of preparation from (A) organosilicon compound(s) having at least two condensable groups, (B) fine-particle metacarbonate, and, optionally, (C) crosslinking agent(s).

The condensable groups present in the organosilicon compounds and which participate in the crosslinking reaction can be any desired condensable groups, e.g. hydroxy groups, oximato groups, amino groups, and organyloxy groups.

The organosilicon compounds (A) can be any of the organosilicon compounds having at least two condensable groups which are crosslinkable via a condensation reaction. These can be either pure siloxanes, i.e. $\equiv$Si—O—Si$\equiv$ structures; or else silcarbanes, i.e. $\equiv$Si—R"—Si$\equiv$ structures, R" being a divalent hydrocarbon radical, substituted or unsubstituted or interrupted by heteroatoms; or can be copolymers having any desired organosilicon groups.

The organosilicon compounds (A) are preferably those containing units of the formula

$$R_a Y_b SiO_{(4-a-b)/2} \quad (I),$$

where

R are identical or different and are substituted or unsubstituted hydrocarbon radicals which may be interrupted by non-adjacent oxygen atoms, Y are identical or different and are a hydroxy radical or hydrolyzable radical, a is 0, 1, 2, or 3, preferably 1 or 2, more preferably 2, and b is 0, 1, 2, or 3, preferably 0, 1, or 2, more preferably 0, with the proviso that the sum of a and b is less than or equal to 4 and at least two Y radicals are present per molecule.

The organosilicon compounds (A) can be either silanes, i.e. compounds of the formula (I) where a+b=4, or else siloxanes, i.e. compounds containing units of the formula (I) where a+b$\leq$3. The organosilicon compounds (A) used in the invention are preferably organopolysiloxanes, particularly those composed of units of the formula (I).

The radical R is preferably a monovalent hydrocarbon radical having from 1 to 18 carbon atoms, these preferably being substituted by halogen atoms, by amino groups, ether groups, ester groups, epoxy groups, mercapto groups, cyano groups, or (poly)glycol radicals, the latter being composed of oxyethylene units and/or of oxypropylene units, particular preference being given here to hydrocarbon radicals having from 1 to 12 carbon atoms, in particular the methyl radical and the vinyl radical. However, the radical R can also be a divalent radical which, for example, bond two silyl groups to one another.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as the o-, m-, and p-tolyl radicals, xylyl radicals and ethylphenyl radicals; and aralkyl radicals such as the benzyl radical, and the α- and the β-phenylethyl radicals. Examples of substituted radicals R are the methoxyethyl, ethoxyethyl, and ethoxyethoxyethyl radicals.

Examples of radicals Y are the hydroxy radical, oximato groups, amino groups, and organyloxy groups. The radical Y is preferably a hydroxy radical or OR$^1$ radical, where R$^1$ is an unsubstituted or substituted hydrocarbon radical optionally interrupted by non-adjacent oxygen atoms, e.g. the methoxy, ethoxy, n-propoxy, isopropoxy, n-butoxy, isobutoxy, s-butoxy, tert-butoxy, 2-methoxyethoxy, hexoxy, and octoxy radicals.

Examples of radicals R$^1$ are the monovalent radicals described above for R. The radical R$^1$ is preferably an alkyl radical having from 1 to 12 carbon atoms, more preferably the methyl or ethyl radical.

The radical Y is most preferably an —OR$^1$ radical, where R$^1$ is identified above, in particular the methoxy and ethoxy radicals.

Inventively used organosilicon compounds (A) are more preferably those of the formula

where each of R and Y are identical or different and have one of the definitions given above, e is from 30 to 5000, and f is 0, 1 or 2.

Preferably, f is 2 if Y is a hydroxy radical, and f is preferably 1 or 0 if Y is a hydrolyzable radical, such as a methoxy or ethoxy radical.

Examples of organosilicon compounds (A) are
(MeO)$_2$MeSiO[SiMe$_2$O]$_{200-2000}$SiMe(OMe)$_2$,
(HO)Me$_2$SiO[SiMe$_2$O]$_{200-2000}$SiMe$_2$(OH),
(EtO)$_2$MeSiO[SiMe$_2$O]$_{200-2000}$SiMe(OEt)$_2$,
(MeO)$_2$MeSiO[SiMe$_2$O]$_{200-2000}$SiVi(OMe)$_2$,
(MeO)$_2$ViSiO[SiMe$_2$O]$_{200-2000}$SiVi(OMe)$_2$,
(EtO)$_2$MeSiO[SiMe$_2$O]$_{200-2000}$SiVi(OEt)$_2$, and
(EtO)$_2$ViSiO[SiMe$_2$O]$_{200-2000}$SiVi(OEt)$_2$, where Me is methyl radical, Et is ethyl radical, and Vi is vinyl radical.

The viscosity of the organosilicon compounds (A) is preferably from 10$^4$ to 10$^6$ mPas, more preferably from 10$^5$ to 500,000 mPas, in each case at 25° C. The organosilicon compounds (A) are commercially available products or can be prepared by methods familiar in silicon chemistry.

Component (B) is preferably fine-particle metacarbonate whose average particle diameter is preferably from 0.1 to 30 μm, more preferably from 1 to 10 μm. The calcium carbonate content of component (B) is at least 90% by weight, more preferably from 95 to 99.5% by weight. The BET specific surface area of component (B) is preferably at most 15 m$^2$/g, more preferably from 0.1 to 15 m$^2$/g, and in particular from 1 to 10 m$^2$/g. The oil absorption value (ISO 787/5) of component (B) is preferably more than 1 g/100 g, more preferably from 10 to 50 g/100 g, and in particular from 10 to 30 g/100 g. Component (B) is preferably fine-particle marble, which can be prepared via grinding of naturally occurring marble, and is a commercially available product.

The surface of component (B) has preferably received no chemical treatment. As a consequence of the preparation process, however, the surface of component (B) can comprise small proportions of organic substances, e.g. those used in the grinding process. Non-ionic surfactants are examples of these. However, if desired, the surface of component (B) can also have been chemically treated, for example with carboxylic esters, but it is preferable to exclude treatment with stearic acid.

The amounts of component (B) present in the inventive compositions are preferably from 1 to 500 parts by weight, particularly preferably from 10 to 300 parts by weight, and in particular from 50 to 200 parts by weight, based in each case on 100 parts by weight of organosilicon compound (A).

The optional crosslinking agents (C) can be any desired crosslinking agents having at least two condensable radicals, e.g. silanes or siloxanes having at least two organyloxy groups. The crosslinking agents (C) are preferably organosilicon compounds of the formula

where

R$^2$ are identical or different and are monovalent, unsubstituted or substituted hydrocarbon radicals which are optionally interrupted by non-adjacent oxygen atoms, Z can be identical or different, with the same definition as for Y with the exception of the hydroxy group, and c is 2, 3 or 4, or else partial hydrolyzates of these.

These partial hydrolyzates can be partial homohydrolyzates, i.e. partial hydrolyzates of one type of organosilicon compound of the formula (III), or else can be partial cohydrolyzates, i.e. partial hydrolyzates of at least two different types of organosilicon compounds of the formula (III).

Although this is not stated in formula (III), the inventive organosilicon compounds may, as a function of the preparation process, have a small proportion of hydroxy groups, preferably up to at most 5% of all of the Si-bonded radicals.

If the crosslinking agents (C) are partial hydrolyzates of organosilicon compounds of the formula (III), preference is given to those having up to 10 silicon atoms.

Examples of radical R$^2$ are the monovalent examples mentioned above for radical R, preference being given to hydrocarbon radicals having from 1 to 12 carbon atoms with particular preference being given to the methyl and the vinyl radical.

Examples of Z are the examples given for Y with the exception of hydroxy group. The radicals Z are preferably —OR$^1$ radicals, where R$^1$ is defined as above, in particular methoxy radicals and ethoxy radicals.

The crosslinking agents (C) are preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 1,2-bis(trimethoxysilyl)ethane, 1,2-bis(triethoxysilyl)ethane, (N-cyclohexylaminomethyl)triethoxysilane, (N-cyclohexylaminomethyl)trimethoxysilane, (methacryloxymethyl)triethoxysilane, (methacryloxymethyl)trimethoxysilane and (morpholinomethyl)trimethoxysilane, or partial hydrolyzates of the organosilicon compounds mentioned, e.g. hexaethoxydisiloxane. The crosslinking agents (C) are most preferably tetramethoxysilane, tetraethoxysilane, tetrapropoxysilane, methyltrimethoxysilane, methyltriethoxysilane, vinyltrimethoxysilane, vinyltriethoxysilane, phenyltrimethoxysilane, 1,2-bis(trimethoxysilyl)ethane, 1,2-bis(triethoxysilyl)ethane, or else their partial hydrolyzates, and in particular are methyltrimethoxysilane, vinyltrimethoxysilane, methyltriethoxysilane, vinyltriethoxysilane, tetraethoxysilane, (N-cyclohexylaminomethyl)trimethoxysilane, (morpholinomethyl)trimethoxysilane, or their partial hydrolyzates.

The crosslinking agents (C) are commercially available products or can be prepared by processes known in silicon chemistry. If the inventive compositions comprise crosslinking agents (C), the amounts are preferably from 0.01 to 20 parts by weight, more preferably from 0.5 to 10 parts by weight, and in particular from 3 to 8 parts by weight, based on 100 parts by weight of organosilicon compound (A).

In addition to components (A), (B), and, optionally, (C) described above, the inventive compositions can then comprise any of the other substances which are useful in compositions crosslinkable via a condensation reaction, e.g. curing accelerators (D), plasticizers (E), fillers (F) other than component (B), coupling agents (G), and additives (H).

Curing accelerators (D) are any of the curing accelerators which accelerate cure of compositions crosslinkable via a condensation reaction. Examples of curing accelerators (D) are organotin compounds, e.g. di-n-butyltin dilaurate and di-n-butyltin diacetate, di-n-butyltin oxide, dioctyltin diacetate, dioctyltin dilaurate, dioctyltin oxide, reaction products of these compounds with alkoxysilanes such as tetraethoxysilane, preference being given to organotin compounds and particular preference being given to di-n-butyltin diacetate and dibutyltin oxide in tetraethyl silicate hydrolyzate, in particular, di-n-butyltin oxide in tetraethyl silicate hydrolyzate. If the inventive compositions comprise a curing accelerator (D), the amounts are preferably from 0.01 to 3 parts by weight, preferably from 0.05 to 2 parts by weight, based on 100 parts by weight of constituent (A).

Examples of plasticizers (E) are dimethylpolysiloxanes which are liquid at room temperature and which have been end-capped by trimethylsiloxy groups, in particular with viscosities at 25° C. in the range from 20 to 5000 mPas, organopolysiloxanes which are liquid at room temperature and ambient pressure and which are in essence composed of —$SiO_{3/2}$ units, —$SiO_{2/2}$ units and ≡$SiO_{1/2}$ units, known as T, D and M units, and high boiling point hydrocarbons, e.g. paraffin oils or mineral oils composed in essence of naphthenic and paraffinic units. Plasticizer (E) is preferably a linear polydimethylsiloxanes having trimethylsilyl end groups. The amount of plasticizer (E) present is preferably from 0 to 300 parts by weight, more preferably from 10 to 200 parts by weight, and in particular from 20 to 100 parts by weight, based on 100 parts by weight of organosilicon compound (A).

Examples of fillers (F) are nonreinforcing fillers, i.e. fillers whose BET surface area is up to 50 $m^2/g$, e.g. quartz, diatomaceous earth, calcium silicate, zirconium silicate, zeolites, metal oxide powders such as aluminum oxides, titanium oxides, iron oxides, or zinc oxides, or mixed oxides of these, barium sulfate, gypsum, silicon nitride, silicon carbide, boron nitride, glass powder, and plastic powders such as polyacrylonitrile powder; reinforcing fillers, i.e. fillers whose BET surface area is more than 50 $m^2/g$ such as fumed silica, precipitated silica, carbon black, such as furnace black and acetylene black, and silicon-aluminum mixed oxides having high BET surface area; fibrous fillers such as asbestos, and also synthetic fibers. The fillers mentioned may have been hydrophobicized, for example via treatment with organosilanes or with organosiloxanes, or via etherification of hydroxy groups to give alkoxy groups. If the intention is to use fillers (F) with a chemically treated surface, it is preferable to exclude stearic acid as treatment agent. If fillers (F) are used, they are preferably hydrophilic or hydrophobic, fumed silica. The amount of filler (F) is preferably from 0 to 300 parts by weight, more preferably from 1 to 200 parts by weight, and in particular from 5 to 200 parts by weight, based on 100 parts by weight of organosilicon compound (A).

Examples of coupling agents (G) are silanes and organopolysiloxanes having functional groups, e.g. those having glycidoxypropyl, aminoalkyl, aminoethylaminoalkyl or methacryloxypropyl radicals. However, if another component such as organosilicon compound (A) or crosslinking agent (C) itself has the functional groups mentioned, it is possible to omit addition of coupling agent. The amounts of coupling agent (G) is preferably from 0 to 50 parts by weight, more preferably from 0.1 to 20 parts by weight, and in particular from 0.2 to 5 parts by weight, based in each case on 100 parts by weight of organosilicon compound (A).

Examples of additives (H) are pigments, dyes, odorants, oxidation inhibitors, agents for influencing electrical properties, e.g. conductive carbon black, flame-retardant agents, light stabilizers, fungicides, agents for prolonging skinning time, such as silanes having an SiC-bonded mercaptoalkyl radical, cell-generating agents, e.g. azodicarbonamide, heat stabilizers, scavengers, such as silylamides or silazanes containing Si N, cocatalysts, such as Lewis acids and Brönsted acids, e.g. sulfonic acids, phosphoric acids, phosphoric esters, phosphonic acids and phosphonic esters, agents having thixotropic effect, e.g. phosphoric esters, organic solvents, such as alkyl aromatics, and also any desired siloxanes other than component (A).

Examples of siloxanes that can be used as component (H) are those composed of units of the formula (I) which contain precisely one radical Y per molecule, e.g. monohydroxydiorganopolysiloxanes. These monofunctional siloxanes are preferably used to control modulus. Preferred additives (H) are phosphonic acids and phosphonic esters, dyes, and fungicides. If the inventive compositions comprise additive (H), as is preferred, the amount is preferably from 0.01 to 100 parts by weight, more preferably from 0.1 to 30 parts by weight, and in particular from 0.3 to 10 parts by weight, based in each case on 100 parts by weight of organosilicon compound (A).

The inventive compositions are most preferably those composed of (A) organosilicon compounds containing units of the formula (I) and (B) fine-particle marble, optionally:

(C) crosslinking agent of the formula (III), (D) curing accelerator(s), (E) plasticizer(s), (F) filler(s), (G) coupling agents, and (H) further additives.

The inventive compositions are preferably viscous to pasty compositions.

To provide the inventive compositions, all of the constituents can be mixed with one another in any desired sequence. In a particular example, organosilicon compound (A), crosslinking agent (C), and plasticizer (E) are premixed, and then fine-particle marble (B) and filler (F) are mixed into the material. This mixing can take place at room temperature and at the pressure of the ambient atmosphere, i.e. from about 900 to 1100 hPa. If desired, however, this mixing can also take place at higher temperatures, e.g. at temperatures in the range from 35° C. to 135° C. Another possibility is mixing for a period or entirely under reduced pressure, e.g. at an absolute pressure of from 30 to 500 hPa, in order to remove volatile compounds or air.

Each of the constituents of the inventive compositions can be one type of that constituent or else a mixture composed of at least two different types of these constituents.

The usual water content of air is sufficient for the crosslinking of the inventive compositions. Crosslinking preferably takes place at room temperature, but it can also be carried out, if desired, at temperatures higher or lower than room temperature, e.g. at from 5° to 15° C. or at from 30° C. to 50° C., and/or by means of water concentrations exceeding the normal water content of air. Direct admixture of water or of aqueous substances is also possible. Crosslinking is preferably carried out at a pressure of from 100 to 1100 hPa, in particular at the pressure of the ambient atmosphere, i.e. from about 900 to 1100 hPa.

The present invention also provides moldings produced via crosslinking of the inventive compositions.

The inventive compositions can be used for any intended purpose for which it is possible to use compositions which can be stored with exclusion of water and which crosslink to give elastomers at room temperature on exposure to water. The inventive compositions therefore have excellent suitability, for example, as sealing compositions for joints, inclusive of vertically running joints, and for similar cavities whose gap width is, for example, from 10 to 40 mm, e.g. in buildings, in land vehicles, in watercraft, and in aircraft, or as adhesives or putty compositions, e.g. in window construction or in the production of display cabinets, or else, for example, for the production of protective coatings, inclusive of those for surfaces having continuous exposure to fresh or salt water, or of antislip coatings, or of elastomeric moldings, or else for insulation of electrical or electronic apparatuses.

An advantage of the inventive compositions is that they are easy to prepare and feature very high storage stability, but also have very good handling properties during application with excellent usage properties in a wide variety of applications. A further advantage is that they have very good adhesion to a wide variety of substrates, while a further advantage is that once they have been hardened they are characterized by low modulus.

In the examples described below, all viscosities are based on a temperature of 25° C. unless otherwise stated, are carried out at the pressure of the ambient atmosphere, i.e. at about 1000 hPa, and at room temperature, i.e. at about 23° C. or at a temperature which becomes established when the reactants are combined at room temperature without additional heating or cooling, and at about 50% relative humidity. All of the parts and percentages are based on weight unless otherwise stated.

Oil absorption number is determined in accordance with ISO 787/5, while Shore A hardness is determined in accordance with ISO 868.

Inventive Example 1

300 g of a polydimethylsiloxane mixture in which the siloxanes are terminated by dimethoxymethylsilyl and dimethoxyvinylsilyl groups, the ratio of dimethoxymethylsilyl end groups to dimethoxyvinylsilyl end groups is about 1:1, having a viscosity of 300,000 mPa·s; 180 g of a trimethylsilyl-end-capped polydimethylsiloxane whose viscosity is 1000 mPa·s; 25 g of methyltrimethoxysilane; and 20 g of a coupling agent prepared via reaction of 1 part of aminopropyltriethoxysilane with 1 part of methyltriethoxysilane hydrolyzate whose ethoxy content is 37%, are mixed with one another in a planetary mixer and stirred for 15 minutes. The mixture is then completed by mixing for homogeneous incorporation of 240 g of ground metacarbonate whose average particle diameter is about 2.6 μm, whose calcium carbonate content is 98%, and whose oil absorption value is 20 g/100 g (available commercially under the tradename "Saxolith 2 HE" from GEOMIN Erzgebirgische Kalkwerke GmbH, Germany), 40 g of hydrophilic, fumed silica whose specific surface area is 150 m²/g (available commercially as HDK® V 15 from Wacker Chemie AG, Munich, Germany), 1.5 g of octylphosphonic acid and 2.8 g of a tin catalyst prepared via reaction of di-n-butyltin diacetate and tetraethoxysilane.

The resultant composition was drawn off for storage in moisture-tight packs and stored at 100° C. for 10 days in these packs to accelerate aging processes. 7 days after preparation, the skinning time of the composition was 7 minutes (25° C., 50% relative humidity) and it cured within 7 days (25° C., 50% relative humidity) to give an elastomeric material whose Shore A hardness is 17.

After storage of the moisture-tight packs at 100° C. for 10 days, the skinning time measured was 18 minutes (25° C., 50% relative humidity). The resultant stored composition cured within a period of 7 days (25° C., 50% relative humidity) to give tack-free, elastomeric material whose Shore A hardness was 10.

Inventive Example 2

The procedure described in inventive example 1 is repeated with the modification that, instead of 240 g of ground metacarbonate described in Example 1, 240 g of ground metacarbonate whose average particle diameter is about 5.0 μm, and whose calcium carbonate content is 98%, and whose oil absorption number is 16 g/100 g (available commercially under the tradename OMYACARB® 5-GU from Omya GmbH, Cologne, Germany) are used.

7 days after preparation, the skinning time of the resultant composition was 5 minutes (25° C., 50% relative humidity) and it cured within 7 days (25° C., 50% relative humidity) to give an elastomeric material whose Shore A hardness is 21.

After storage of the moisture-tight packs at 100° C. for 10 days, the skinning time measured was 10 minutes (25° C., 50% relative humidity). The resultant stored composition cured within a period of 7 days (25° C., 50% relative humidity) to give tack-free, elastomeric material whose Shore A hardness was 12.

Inventive Example 3

The procedure described in inventive example 1 is repeated with the modification that, instead of 240 g of ground metacarbonate described therein, 240 g of ground metacarbonate whose average particle diameter is about 2.0 μm, and whose calcium carbonate content is 98%, and whose oil absorption number is 18 g/100 g (available commercially under the tradename "CARBITAL 110" from Imerys Minerals Ltd., England) are used.

7 days after preparation, the skinning time of the resultant composition was 8 minutes (25° C., 50% relative humidity) and it cured within 7 days (25° C., 50% relative humidity) to give an elastomeric material whose Shore A hardness is 23.

After storage of the moisture-tight packs at 100° C. for 10 days, the skinning time measured was 11 minutes (25° C., 50% relative humidity). The resultant stored composition cured within a period of 7 days (25° C., 50% relative humidity) to give tack-free, elastomeric material whose Shore A hardness was 11.

Comparative Example 1

The procedure described in inventive example 1 is repeated with the modification that, instead of 240 g of ground metacarbonate 240 g of precipitated chalk which has been chemically treated with stearic acid and whose average particle diameter was about 0.04 μm, and whose BET surface area was 22 m²/g (available commercially under the tradename "WINNOFIL SPM" from Solvay Soda Deutschland GmbH, Rheinberg, Germany) are used.

7 days after preparation, the skinning time of the resultant composition was 7 minutes (25° C., 50% relative humidity) and it cured within 7 days (25° C., 50% relative humidity) to give an elastomeric material whose Shore A hardness is 28.

After as little as only 5 days of storage of the moisture-tight packs at 100° C., the composition then failed to cure to give a tack-free material; it was then impossible to determine Shore A hardness.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A crosslinkable, storage stable, moisture-curable RTV-1 organopolysiloxane composition, comprising
    (A) at least one organosilicon compound of the formula

    $$Y_{3-f}R_fSi-(SiR_2O)_e-SiR_fY_{3-f} \quad (II)$$

where
    R each are identical or different unsubstituted or substituted hydrocarbon radicals which are optionally interrupted by non-adjacent oxygen atoms,
    Y each are identical or different and are a hydrolyzable radical —OR,
    e is from 30 to 5000, and
    f is 0, 1, or 2,
    (B) a calcium carbonate filler consisting of fine-particle metacarbonate, and
    (C) one or more crosslinking agents, wherein the storage stability of the storage stable composition is higher than an otherwise similar composition wherein the calcium carbonate filler is not calcium metacarbonate.

2. The crosslinkable composition of claim 1, wherein R in the group —OR is methyl.

3. The crosslinkable composition of claim 1, wherein the one or more crosslinking agents (C) are selected from the group consisting of tetramethoxysilane, methyltrimethoxysilane, and vinyltrimethoxysilane.

4. The crosslinkable composition of claim 1, wherein R in the group —OR is methyl or ethyl.

5. A molding, produced via crosslinking of a composition of claim 4.

6. The crosslinkable composition of claim 1, wherein component (B) is fine-particle metacarbonate whose average particle diameter is from 0.1 to 30 μm.

7. A molding, produced via crosslinking of a composition of claim 6.

8. The crosslinkable composition of claim 1, wherein the calcium carbonate content of component (B) is at least 90% by weight.

9. A molding, produced via crosslinking of a composition of claim 8.

10. The crosslinkable composition of claim 1, wherein the specific surface area of component (B) is at most 15 m²/g.

11. A molding, produced via crosslinking of a composition of claim 10.

12. The crosslinkable composition of claim 1, wherein the oil absorption value (ISO 787/5) of component (B) is more than 1 g/100 g.

13. A molding, produced via crosslinking of a composition of claim 12.

14. The crosslinkable composition of claim 1, wherein the amount of component (B) is from 1 to 500 parts by weight, based on 100 parts by weight of organosilicon compound (A).

15. A molding, produced via crosslinking of a composition of claim 14.

16. A molding, produced via crosslinking of a composition of claim 3.

17. A molding, produced via crosslinking of a composition of claim 1.

18. The RTV-1 composition of claim 1, wherein the total filler consists of fine particle metacarbonate and one or more fillers selected from the group consisting of diatomaceous earth, calcium silicate, zirconium silicate, zeolites, metal aluminum oxides, titanium oxides, iron oxides, zinc oxides, barium sulfate, gypsum, silicon nitride, silicon carbide, boron nitride, glass powder, plastic powders, fumed silica, precipitated silica, carbon black, and silicon-aluminum mixed oxides.

19. The RTV-1 composition of claim 1, wherein the filler consists of fine calcium metacarbonate and silica.

20. The composition of claim 1, wherein the calcium metacarbonate is not surface treated.

* * * * *